May 13, 1952 H. WICKHAM ET AL 2,596,750
FOLDING SEAT
Filed Nov. 15, 1948 2 SHEETS—SHEET 1
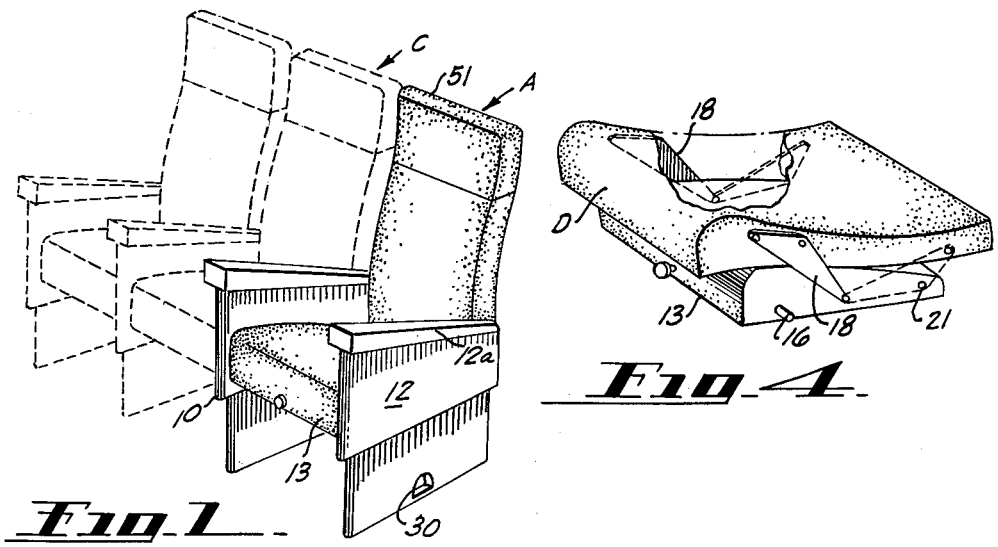
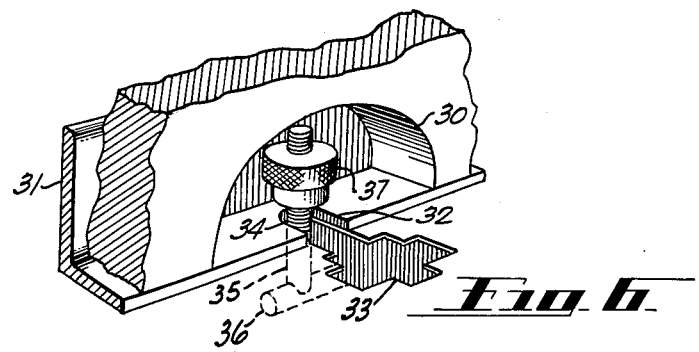
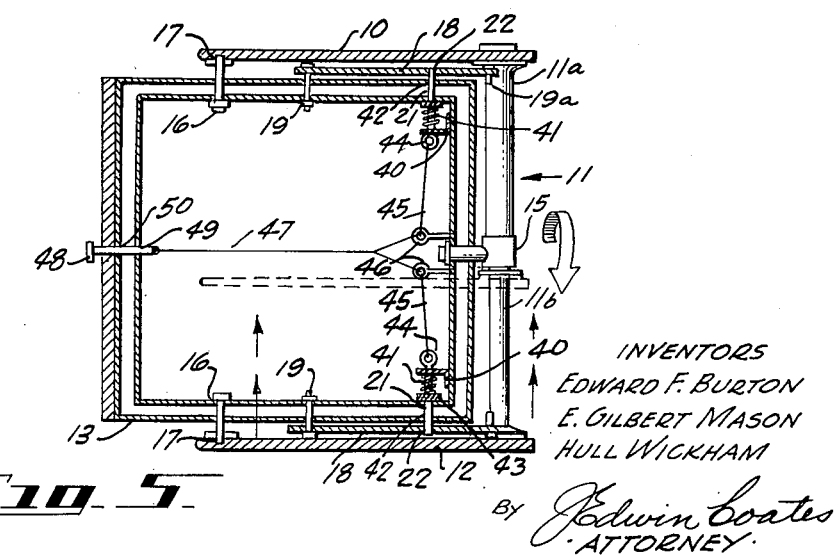
INVENTORS
EDWARD F. BURTON
E. GILBERT MASON
HULL WICKHAM
BY Edwin Coates
ATTORNEY May 13, 1952 H. WICKHAM ET AL 2,596,750
FOLDING SEAT Filed Nov. 15, 1948 2 SHEETS—SHEET 2

INVENTORS
EDWARD F. BURTON
E. GILBERT MASON
HULL WICKHAM
BY
J. Edwin Coates
ATTORNEY Patented May 13, 1952

2,596,750

UNITED STATES PATENT OFFICE 2,596,750

FOLDING SEAT

Hull Wickham, Mattituck, N. Y., and Edward F. Burton and Ernest Gilbert Mason, West Los Angeles, Calif., assignors to Douglas Aircraft Company, Inc., Santa Monica, Calif.

Application November 15, 1948, Serial No. 60,062

9 Claims. (Cl. 155—33)

This invention relates to auxiliary seats, such as folding seats, and particularly to those adapted for use in the aisles of vehicles, such as airplanes, street cars, and omnibuses, as during the peak of business, thereby to enable the vehicle to carry and seat the augmented traffic.

Folding seats are generally considered rather "flimsy" and unstable and even unsafe or insecure, or at least rather unreliable; for one reason, because their foldable components are usually so joined to each other as to render the seat non-rigid and unstable or even shaky and weak. Again, to enable such seats to occupy less space when folded, the ordinary one has to be of such reduced dimensions and so bare of upholstery and other conveniences that it is either shunned by the passengers or it is occupied under protest and in discomfort. Moreover, in order to minimize the space necessary for their stowage, it has been deemed necessary to employ such complex systems of joint-connections and operating mechanisms that the passengers and vehicle crews find such seats difficult and laborious to manipulate and often inoperable because of jamming of the operating linkage or the like.

The present invention overcomes these and other disadvantages in the art and provides an auxiliary passenger accommodation in the form of a folding aisle seat substantially as stable and secure as rigid, unfoldable or fixed-frame seats and in which the occupant will be supported as dependably as the occupant of one of the rigid vehicle seats, and in as many attitudes, including reclining. At the same time, because of the improved mode of foldably uniting the components of the seat, enabling them to be folded and stowed in the minimum of aisle space, the seat can be made of the same size, shape and upholstering as a regular seat, thereby to confer unusual commodiousness and luxuriousness upon it for an emergency or auxiliary seat, yet it can be stowed in an unusually small space for such a commodious and luxurious seat. By virtue of improved pivotal connections of the parts to each other and to the main seat support, the seat can be folded and unfolded with ease in the minimum amount of time and occupy the minimum amount of stowage space considering the size and luxuriousness of the seat components.

In one of the now-preferred embodiments of the invention, the seat, in its general configuration, essentially includes a pair of seat sides, the one of which is constituted by the fixed outer end of the outermost seat in a transverse row of conventional seats, the opposite seat-side consisting of a substantially duplicate member disposed in vertical parallelism to the first member and laterally movable or slidable relatively to the first said member, both side members carrying arm rests at their upper edges. A horizontally disposed telescopable tubular member is attached at its inner, or "standing," end to the fixed seat side and directly carries the movable seat side and the seat bottom and indirectly carries the seat-back which is carried by the seat bottom. The telescopic tube thus constitutes the principal framing-element or basal structural member of the seat. A seat-bottom is pivotally and slidably connected to the standing part of the tubular member for rotation about the longitudinal axis of said seat bottom into horizontal and vertical planes and for sliding movement against and away from the fixed seat side and is pivotally linked, medially of its opposite sides, to a reclinable seat back, the latter being disposed between the seat sides above the telescopic member to enable the seat back to be folded downwardly on the seat bottom and then rotated with the bottom and slid inwardly against the fixed seat end to compact the seat.

The seat is unfolded for use by sliding the movable side outwardly away from the fixed side to the limit of the movement of the inner tube of the telescopic member, whereupon the back-and-bottom unit can be slid outwardly on the outer tube of the telescopic member and is then rotated into horizontal position in the space between the spaced seat-sides, suitable detents on the seat bottom then engaging the seat bottom to the seat sides. Thereafter, the back is raised and suitable detents on the seat-bottom engage the arms linking the seat bottom to the seat back to lock them in back-hinging position, the back then being inclinable rearwardly and forwardly by the passenger's leaning backwardly or forwardly.

The mere act of folding the seat stows and secures it out of the way on the one side of the aisle. To fold and stow it, the floor attachment means and the seat-bottom detents are first disengaged, whereafter the seat back is released and folded into contact with the seat bottom. Thereafter, the folded back and bottom unit is rotated about its pivotal connections with the telescopic tube and stowed against the outer end of the fixed seat, whereupon the movable side of the seat can be slid inwardly against the previously folded components of the seat, thus compacting the seat and disposing it out of the path of passengers traversing the aisle.

The other improvements and advances effected by the invention will either be made manifest in, or become apparent from the following illustrative description and accompanying drawings disclosing one of the now-preferred embodiments of the invention, but by way of example and clarification only.

In these drawings:

Figure 1 is a front perspective view of a transverse row of vehicle seats, showing in solid lines, the folding seat of this invention unfolded into the aisle and ready for occupancy, the fixed seats appearing in broken lines;

Figure 4 is a detailed perspective view showing the seat back folded into contact with the seat bottom preparatory to the two being rotated and stowed against the adjacent end of the fixed seat;

Figure 5 is a horizontal sectional view of the seat taken on the line 5—5 of Figure 3;

Figure 6 is a fragmentary perspective view of a lower portion of the movable side of the seat showing the mode of detachably attaching the movable side to the floor of the vehicle.

Figure 7:
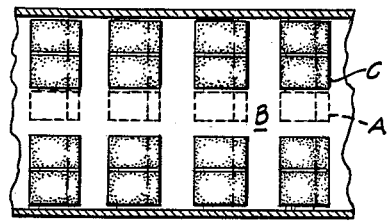
Figure 7 is a fragmentary schematic plan view of a vehicle body showing, in broken lines, the relationship of the folding seats to the other seats and to the aisle.

The auxiliary seat A typified in the drawings is mounted in an aisle B on the aisle-side member 10 of a conventional seat C constituting one of a transverse row of seats, and is essentially constructed or framed on and about a telescopable tube 11, having its outer fixed tubular member 11a rigidly attached at its flanged inner end to said side 10 and having its movable inner tubular member 11b extendible outwardly therefrom into the aisle. The fixed side 10 of the conventional seat constitutes one of the sides of the present foldable seat. The outer end of the tube 11 is flanged and attached securely to a laterally movable or slidably disposed seat-side 12 constituting the opposite side of the auxiliary seat. The side 12 is positionable closer to or farther away from the fixed side 10 as desired to either stow or unfold the seat, in either case remaining in spaced parallelism therewith. The member 12 includes an arm-rest 12a like those shown on the permanent seats and the remainder of the side may have a modernistic conformation, the lower portion being vertically stepped with reference to the upper portion and rigidly integral therewith.

Figure 2:
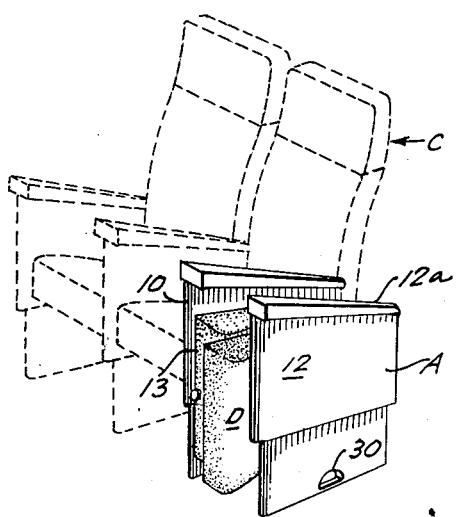
Figure 2 is a similar view, showing the aisle seat in folded and stowed condition.

A seat bottom 13 is rotatably supported in the central region of its rear edge on a pivot pin 14 forming a part of a bracket 15. The bracket 15 is in the form of a sleeve slidably mounted on the fixed or standing member of the telescopable tube 11 to enable the bracket to move from its outward position as shown in Figure 5 when the seat is extended for use to an inward position when the seat is folded as shown in Figure 2. The suspension of the seat bottom between the seat sides 10 and 12 is completed by means of pins 16 positioned one on each side of the seat bottom, preferably near the front edge and adapted to engage in suitable openings 17 provided in the seat sides 10 and 12 at a suitable point above the floor level. The sides 10 and 12 are separated sufficiently to clear the ends of pins 16 which are then aligned with apertures 17. Side 12 is then moved toward side 10 to engage the pins in the apertures.

A seat back D is provided with a removable head rest 51, having dowel pins 52 fitting in sockets 53 formed in the seat back, and bottom by means of a pair of links here shown as triangular arms 18, disposed one on each side of the seat bottom adjacent the rear halves thereof. The forward end of each arm is pivotally connected to the adjacent side of the seat bottom substantially in the central portion 19 of the seat bottom. The rearward end of each arm is pivotally connected by a pin 19a to the lower portion of the seat-back at a point 20, the back being disposed between the seat sides above the rear edge of the seat bottom and above the telescopable tube. The arms 18 are thus adapted to move parallel to the seat sides from their normal rearwardly disposed attitudes to the forwardly disposed positions shown in Figure 4 when the seat is folded. In the unfolded, occupiable position of the seat, these arms are restrained from movement by means of spring-urged pins 21 which engage in appropriate apertures 22 provided therefor in the apices of the triangular arms. The pins pass through brackets 40 and springs 41 into apertures 42 and are provided with washers 43 pinned thereto, to engage the inner ends of the springs. Each pin is provided with an eye 44 to which an end of a cable 45 is attached, the cables passing through guiding eyes 46 and uniting to form a single cable 47. A knob 48, accessible from the forward edge of the seat bottom, is provided with a shank 49 passing through aperture 50 and attached to the forward end of cable 47. A forward pull on the knob releases the pins 21 against the resistance of springs 41.

In order to enable the seat back to be adjustably positioned with reference to the seat bottom, thereby to allow the occupant to assume any desired reclining position or the upright position, the upper part of the outer side member 12 is interconnected to the seat back by means of a controllable hydraulic cylinder and piston unit generally designated as 23. This unit may consist of any standard hydraulic lock such as one of the "Hydroloc" units originated by the Douglas Aircraft Company, a modified form of which is shown as comprising a cylinder 24 pivotally mounted to the arm rest at a point 25 in the interior thereof by means including a lug 26. The piston rod 27 of the hydraulic unit terminates rearwardly in adjacency with the seat-back, the rear end of this rod being provided with an eye detachably engaged with a lug 28 on the adjacent side of the seat back. A spring-loaded control button 28a, reciprocably mounted on the front face of the arm rest, is operatively connected to a piston bypass valve 29, indicated in outline on the top of the cylinder, by means of suitable linkage, such as 29a. When the button is pressed inwardly, the linkage opens the bypass valve so that hydraulic fluid held therein can be moved by the moving piston from one portion of the cylinder to another. Thus the seat back, connected to the piston rod, can be moved backwardly and forwardly to assume any desired angular relationship to the seat bottom. Upon release of the button, the bypass valve closes, trapping fluid ahead of and behind the piston, locking the seat back in the desired position until the button is again pressed to open the bypass valve and allow the fluid to move in the cylinder. A similar device may be provided in the other arm rest.

The aforementioned mode of interconnecting the seat sides, of connecting the seat bottom to the seat sides and to the tubular base-member and of connecting the seat-back at two points on its lower portion to the rigidified seat bottom and the seat-side 12, establishes a seat which is securely braced at its vulnerable rear corners and hence is not subject to sidesway or backsway. The auxiliary seat of this invention, although easily foldable and unfoldable, hence incorporates substantially as much strength and stability as a non-folding seat.

In order to prevent the movable side 12 of the unfolded seat from being accidentally displaced laterally on the telescopable tube, and to securely position the seat with respect to the floor, means are provided for detachably attaching the movable side to the floor of the vehicle in properly laterally spaced relationship to the fixed side and to the back when the side 12 has been outwardly adjusted. The attaching device is mounted, in one of the preferred forms, in a semi-circular cutout 30 provided in the lower central portion of the side 12, the cutout being embraced by an angle plate 31 attached to the member 12 and disposed with the one leg thereof closing the bottom of the cutout and lying parallel to the floor. A notch 32 extends inwardly from the outer edge of this leg and is adapted to register with the corresponding portion of a cruciform aperture 33 provided in the floor. A swivel bolt 34 comprising a rod 35 threaded in its upper portion and bearing a transverse arm 36 at its lower extremity is pivotally mounted in the slots 32 and 33 for rotary movement from an upright position to a substantially horizontal position. The threaded portion of the bolt bears a thumb screw 37 of a diameter such as to enable it to pass through the cross-arm of the cruciform aperture 33 when the bolt is swivelled to horizontal position. When the bolt is positioned upright and the thumb screw is tightened, the side member 12 is drawn downwardly into secure engagement with the floor and when the thumb screw is backed off the bolt can be pivoted about the axis of arm 36 and passed through the cross-arm of the notch to a position underneath the floor of the aisle.

Figure 3:
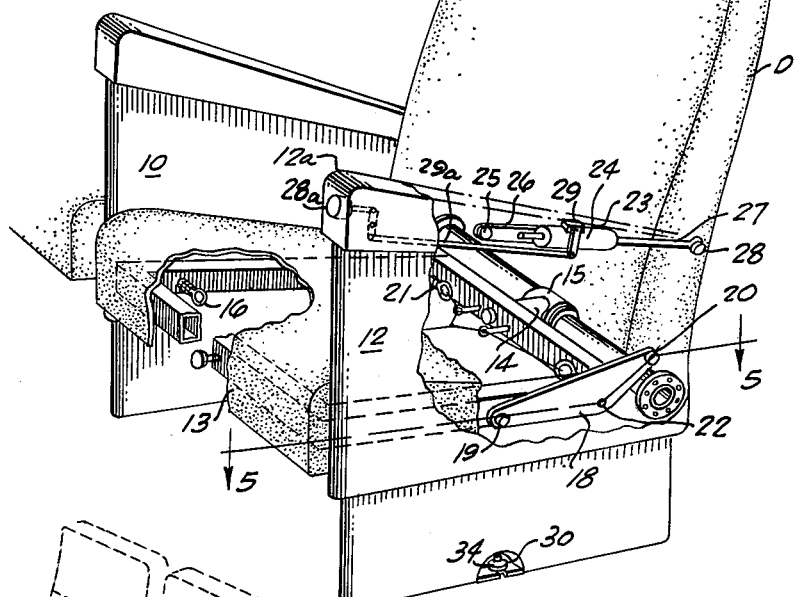
Figure 3 is a perspective view of the aisle seat partly broken away to illustrate its internal configuration.

The seat can readily and quickly be unfolded and expanded for use from its normal position, that is, stowed in relatively small compass against the outer end of a row of fixed seats, by merely pulling outwardly upon the side 12 until the limit of the movement of the inner tube of the telescopable member within the outer member has been reached. Thereby, clearance is provided between the seat sides to enable the seat bottom and back unit to be rotated to a horizontal position between the seat sides about the spindle 14. Thereupon, the pins 16 are engaged with the respective seat sides by moving side 12 toward side 10. The seat back D is then lifted up and bodily moved rearwardly into the position of Figure 3 and pins 21 are allowed to engage apertures 22. The loop at the rear of the piston rod is then attached to lug 28 and the seat back can thereafter be adjusted by the occupant to any desired angular position with respect to the seat bottom by merely depressing the button 28a and leaning backward or pulling the seat forward.

In order to fold and stow the seat, it is only necessary to disengage the loop on the piston rod from the seat back and fold the seat-back into contact with the seat bottom. Thereafter, the swivel bolt 34 is disengaged from the notch in the movable side 12. This side can then be first slid outwardly to release pins 16 and allow the folded unit to be rotated and then laterally transversed against fixed side 10. The movable side is then slid inwardly against the folded back and bottom unit, completing the compact storing of the seat components in the attitude shown in Figure 2.

It is to be understood that the word "telescopable" as used in the description and claims refers to the ability of certain structural members to be moved relative to each other in a manner similar to the axial movement which occurs when sections of a telescope are axially extended or retracted.

While the specific constructional parts and details of one of the presently-preferred embodiments of the invention have been fully set forth, it is to be understood that this has been done by way of illustration and example, only; and that the embodiments which the concepts can take are not thereby limited. The invention, in fact, is limited only by the ambit of the following claims defining the structural essentials of the invention.

We claim:

1. A folding seat, comprising: a fixed seat side; an opposed seat side movable laterally with respect thereto; telescopable means joining said sides to each other; a seat bottom; means connecting said seat bottom to said telescopable member for rotation about the axis of said telescopable member and about the longitudinal axis of said seat bottom; stop means carried by at least one of said seat sides; and means carried by at least one side of said seat bottom and adapted to engage said adjacent stop means to thereby position and retain said seat bottom in a generally horizontal plane.

2. A folding seat, comprising: a fixed seat side; an opposed seat side movable laterally with respect thereto; collapsible means joining said sides to each other; a seat bottom carried by said collapsible means; a link at each side of said seat bottom having its forward end pivotally connected to a medial point of the seat bottom; a seat back pivotally connected to the rear end of each link to provide for angular adjustment; and means carried by the rear portion of said seat bottom to engage an intermediate point of each link to secure it in predetermined angular relation to said seat bottom.

3. A folding seat as claimed in claim 2 in which said last mentioned means are disengageable from said links to permit the latter to rotate about their forward pivotal connections and the seat back to be rotated and bodily displaced into substantial parallelism with said seat bottom.

4. A folding seat, comprising: a fixed seat-side; an opposed seat-side movable laterally with respect thereto; a collapsible member joining said sides to each other; a seat bottom; and means connecting said seat bottom to said collapsible member for rotation about the longitudinal axis of said seat bottom into horizontal and vertical planes; said seat bottom substantially filling the space between said seat-sides when in a horizontal position and permitting collapse of said collapsible member when in a vertical position.

5. A folding seat attachment, comprising: a seat-side; a collapsible strut member extending laterally from said seat side and having an end of one of its sections fixedly attached to said seat-side; the free end of the second section of said strut member being adapted for attachment to an abutment; a seat bottom; and means connecting said seat bottom to said strut member for rotation about the longitudinal axis of said seat bottom into a horizontal plane extending laterally away from said seat-side and into a vertical plane substantially parallel to said seat-side.

6. A folding seat attachment, comprising: a seat-side; a collapsible strut member extending laterally from said seat side and having an end of one of its sections fixedly attached to said seat-side; the free end of the second section of said strut member being adapted for attachment to an abutment; a seat bottom; means connecting said seat bottom to said strut member for rotation about the longitudinal axis of said seat bottom into a horizontal plane extending laterally away from said seat-side and into a vertical plane substantially parallel to said seat-side; and a seat back pivotally connected to the rear edge of said seat bottom for rotation into contact with said seat bottom.

7. A folding seat attachment, comprising: a seat-side; a collapsible strut member extending laterally from said seat side and having an end of one of its sections fixedly attached to said seat-side; the free end of the second section of said strut member being adapted for attachment to an abutment; a seat bottom; means connecting said seat bottom to said strut member for rotation about the longitudinal axis of said seat bottom into a horizontal plane extending laterally away from said seat-side and into a vertical plane substantially parallel to said seat-side; a seat back pivotally connected to the rear edge of said seat bottom; and adjustable means connecting said seat side to said seat back to hold it in a predetermined position.

8. A folding seat attachment, comprising: a seat-side; a collapsible strut member extending laterally from said seat side and having an end of one of its sections fixedly attached to said seat-side; the free end of the second section of said strut member being adapted for attachment to an abutment; a seat bottom; means connecting said seat bottom to said strut member for rotation about the longitudinal axis of said seat bottom into a horizontal plane extending laterally away from said seat-side and into a vertical plane substantially parallel to said seat-side; a seat back pivotally connected to the rear edge of said seat bottom for rotation into contact with said seat bottom; and adjustable means releasably connecting said seat side to said seat back to hold it in a predetermined position, and adapted to be released to permit said rotation of said seat back.

9. A folding seat for attachment to an abutment, comprising: a seat side adapted to move laterally with respect to said abutment; telescopable means adapted to join said seat side to said abutment; a seat bottom carried by said telescopable means; means connecting said seat bottom to said telescopable means for rotation about the horizontal longitudinal axis of said seat bottom into horizontal and vertical planes; a link at each side of said seat bottom having its forward end pivotally connected to a medial point of the seat bottom; a seat back pivotally connected to the rear end of each link to provide for angular adjustment; means carried by the rear portion of said seat bottom to engage an intermediate point of each link to secure it in a predetermined angular relation to said seat bottom; and adjustable means releasably connecting said movable seat side to said seat back to hold it in a selected position and to provide for angular adjustment thereof.

HULL WICKHAM.
EDWARD F. BURTON.
ERNEST GILBERT MASON.

REFERENCES CITED

The following references are of record in the file of this patent:

UNITED STATES PATENTS

| Number | Name | Date |
|---|---|---|
| 540,794 | Koch | June 11, 1895 |

FOREIGN PATENTS

| Number | Country | Date |
|---|---|---|
| 800,953 | Great Britain | May 11, 1936 |
| 177,913 | Switzerland | Sept. 2, 1935 |